United States Patent
Lee

(10) Patent No.: US 10,737,794 B2
(45) Date of Patent: Aug. 11, 2020

(54) SAFETY DEVICE AND CRASH PREVENTING DRONE COMPRISING SAME

(71) Applicant: KOREA AEROSPACE RESEARCH INSTITUTE, Daejeon (KR)

(72) Inventor: Seon Ho Lee, Yuseong-gu Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 353 days.

(21) Appl. No.: 15/754,356

(22) PCT Filed: Aug. 5, 2016

(86) PCT No.: PCT/KR2016/008625
§ 371 (c)(1),
(2) Date: Feb. 22, 2018

(87) PCT Pub. No.: WO2017/034174
PCT Pub. Date: Mar. 2, 2017

(65) Prior Publication Data
US 2018/0244394 A1    Aug. 30, 2018

(30) Foreign Application Priority Data

Aug. 27, 2015 (KR) .................. 10-2015-0120961

(51) Int. Cl.
*B64D 17/80* (2006.01)
*B64C 39/02* (2006.01)
*B64D 17/72* (2006.01)

(52) U.S. Cl.
CPC .............. *B64D 17/80* (2013.01); *B64C 39/02* (2013.01); *B64C 39/024* (2013.01); *B64D 17/72* (2013.01);
(Continued)

(58) Field of Classification Search
CPC .. B64D 17/72; B64D 17/80; B64C 2201/107; B64C 2201/185
See application file for complete search history.

(56) References Cited

U.S. PATENT DOCUMENTS 6,302,359 B1   10/2001   Heflin et al.
9,033,281 B1    5/2015   Adams
(Continued)

FOREIGN PATENT DOCUMENTS

CN   103612766 A   3/2014
CN   104443398 A   3/2015
(Continued)

OTHER PUBLICATIONS

International Search Report and Written Opinion for corresponding PCT Application No. PCT/KR2016/008625 dated Oct. 31, 2016, 5 pages.
(Continued)

*Primary Examiner* — Nicholas McFall
(74) *Attorney, Agent, or Firm* — Hoffman Warnick LLC

(57) ABSTRACT

A drone according to an embodiment may comprise: a support table; a main unit spaced from the support table and formed above the support table; a connecting portion for connecting the main unit and the support table; and a propulsion unit provided on the outer side of the support table so as to generate thrust. The main unit may have a through-hole formed therein, a parachute may be provided inside the through-hole, and, during a fall, the parachute may be discharged out of the through-hole by deformation of the connecting portion.

20 Claims, 6 Drawing Sheets

(52) U.S. Cl.
CPC .. *B64C 2201/107* (2013.01); *B64C 2201/185* (2013.01)

(56) References Cited

U.S. PATENT DOCUMENTS

| | | |
|---|---|---|
| 2012/0061508 A1 | 3/2012 | de Viry et al. |
| 2013/0206915 A1 | 8/2013 | Desaulniers |

FOREIGN PATENT DOCUMENTS

| | | |
|---|---|---|
| DE | 3811212 A1 | 10/1989 |
| JP | 2007062630 A | 3/2007 |
| JP | 2009208674 A | 9/2009 |
| KR | 2019990011910 U | 3/1999 |
| KR | 20120021544 A | 3/2012 |
| KR | 20140038495 A | 3/2014 |
| KR | 101496892 B1 | 3/2015 |

OTHER PUBLICATIONS

Extended European Search Report for Application No. 16839463.3, dated Mar. 20, 2019, 31 pages.

SAFETY DEVICE AND CRASH PREVENTING DRONE COMPRISING SAME

TECHNICAL FIELD

The flowing description relates to a safety device, and a crash preventing drone including the safety device.

BACKGROUND ART

A drone refers to an unmanned aerial vehicle or a helicopter-shaped flying vehicle that flies or steers through induction of radio waves without a human pilot or operator being on board, and is initially used for military purposes. A drone is currently used for commercial purposes, in addition to the military purposes. Thus, research has been actively conducted on drones to be used for such various purposes.

However, due to a growing demand for drones, traffic of the drones in the sky is expected to increase, and thus probabilities of collisions between the drones during their flights are also expected to increase. In addition, a probability of a fall or a crash of a drone is also increasing due to various reasons, for example, an unskilled operation of a drone, discharged power of a battery of a drone, and a breakdown or a failure of a drone.

The increases of such risks due to the growing use of drones may produce loss of lives or property damage in worst cases.

For example, the US Patent Publication No. 2012-0061508 entitled "Device for Firing Weapons from an Armed Drone" published in Mar. 15, 2012, discloses a drone that prevents a fall or a crash.

DISCLOSURE OF INVENTION

Technical Goals

An aspect provides a drone that, in case of a fall or a crash due to an abnormality found in the drone, may automatically unfold a parachute included in the drone without power supplied by a mechanical or electrical device, using a weightless state or a zero-gravity state from a free fall of the drone.

Another aspect also provides a flying vehicle that, in case of a fall or a crash of the flying vehicle, may unfold a parachute included in the flying vehicle by an air flow from a bottom to a top of a through-hole formed in a main body of the flying vehicle.

Still another aspect also provides a safety device that may be readily attachable to or detachable from various types of flying vehicle, and may unfold a parachute included in the safety device by an air flow from a bottom to a top in a through-hole formed in a main body thereof.

Technical Solutions

According to an example embodiment, there is provided a drone including a support, a main body provided above the support by being separated from the support, a connector configured to connect the main body and the support, and a thruster provided on an outer side of the support and configured to generate a thrust force. The main body may include a through-hole therein, and the through-hole may contain a parachute therein. When the drone falls, the parachute may be discharged out of the through-hole by the connector being deformed.

The connector may be an elastic member configured to be expanded by a resilient force in response to the main body being in a zero-gravity state.

The drone may further include a needle valve provided on the support, and configured to be engaged with the through-hole when the elastic member is contracted.

The drone may further include a restrictor configured to enclose the elastic member. The restrictor may offset the resilient force of the elastic member.

The restrictor may be a solenoid valve, and an electromagnetic force generated in the solenoid valve may offset the resilient force of the elastic member.

The drone may further include a sealing member provided in a lower end portion of the through-hole to be engaged with the needle valve.

The drone may further include a holder provided inside the through-hole, and the holder may be disposed under the parachute to support the parachute such that the parachute does not fall downwards.

The holder may be provided in a mesh form such that, when the drone falls, an air flow from a bottom to a top of the through-hole may be generated.

The drone may further include a lid provided in an upper end portion of the through-hole, and the lid may be opened by an air flow through the through-hole.

The drone may further include a landing member provided under the support.

According to another example embodiment, there is provided a flying vehicle including a support, a main body provided above the support by being separated from the support, a thruster provided on an outer side of the support and configured to generate a thrust force, a through-hole formed in the main body, a parachute provided inside the through-hole, and a needle valve provided in a lower end portion of the through-hole and configured to be engaged with the through-hole. When the flying vehicle falls, the needle valve may be opened and an air flow from bottom to top may be generated through the through-hole, and the parachute may then be discharged out of the through-hole.

The flying vehicle may further include a sensor configured to sense a falling speed of the flying vehicle and transfer an open signal to the needle valve.

The flying vehicle may further include an elastic member configured to connect the main body and the support. When the main body is in a zero-gravity state, the elastic member may be expanded by a resilient force. When the elastic member is expanded, the needle valve may be opened.

The flying vehicle may further include a holder provided inside the through-hole. The holder may be disposed under the parachute and configured to support the parachute such that the parachute does not fall downwards. The holder may be provided in a mesh form such that an air flow from a bottom to a top of the through-hole may be generated when the flying vehicle falls.

The flying vehicle may further include a lid provided in an upper end portion of the through-hole, and the lid may be opened by an air flow through the through-hole.

According to still another example embodiment, there is provided a safety device to be attached to or detached from a flying vehicle, the safety device including a support, a main body provided above the support by being separated from the support, a through-hole formed in the main body, a parachute provided inside the through-hole, a needle valve provided in a lower end portion of the through-hole and configured to be engaged with the through-hole, and a connector provided under the support and configured to attach or detach the safety device to and from the flying vehicle.

When the safety device falls, the needle valve may be opened and an air flow from bottom to top may be generated through the through-hole, and the parachute may then be discharged out of the through-hole.

The safety device may further include a sensor configured to sense a falling speed of the safety device and transfer an open signal to the needle valve.

The safety device may further include an elastic member configured to connect the main body and the support. When the main body is in a zero-gravity state due to the safety device falling, the elastic member may be expanded by a resilient force. When the elastic member is expanded, the needle valve may be opened.

The safety device may further include a restrictor configured to enclose the elastic member. The restrictor may be a solenoid valve, and an electromagnetic force generated in the solenoid valve may offset the resilient force of the elastic member.

The safety device may further include a holder provided inside the through-hole. The holder may be disposed under the parachute and configured to support the parachute such that the parachute does not fall downwards. The holder may be provided in a mesh form such that an air flow from a bottom to a top of the through-hole may be generated when the safety device falls.

The safety device may further include a lid provided in an upper end portion of the through-hole. The lid may be opened by an air flow through the through-hole.

Advantageous Effects

According to example embodiments described herein, a drone may automatically unfold a parachute included in the drone without power supplied by a mechanical or electrical device, using a weightless state or a zero-gravity state from a free fall of the drone, in case of a fall or a crash due to an abnormality found in the drone.

According to example embodiments described herein, a flying vehicle may unfold a parachute included in the flying vehicle using a force of air generated by an air flow from a bottom to a top of a through-hole formed in a main body thereof, in case of a fall or a crash of the flying vehicle.

According to example embodiments described herein, a safety device may be readily attachable to or detachable from various types of flying vehicle, and may unfold a parachute included in the safety device by an air flow from a bottom to a top of a through-hole formed in a main body thereof.

BEST MODE FOR CARRYING OUT THE INVENTION

Figure 1:
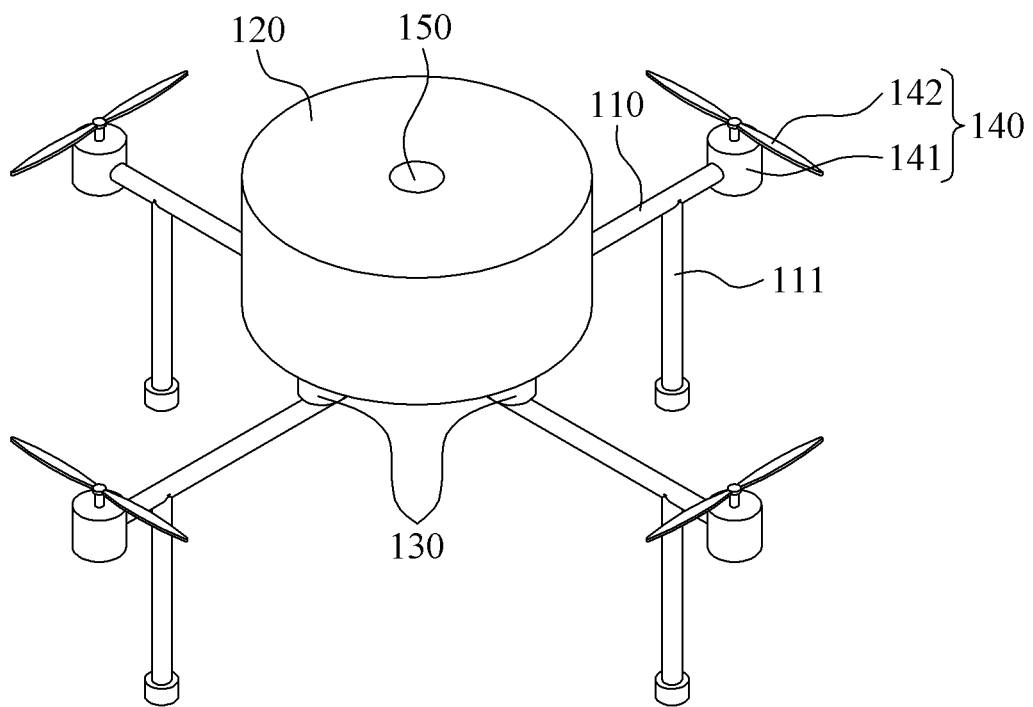
FIG. 1 is a perspective view of a drone including a parachute used to prevent a fall according to an example embodiment.

Hereinafter, some example embodiments will be described in detail with reference to the accompanying drawings. The example embodiments are described in the following detailed description. Regarding the reference numerals assigned to the elements in the drawings, it should be noted that the same elements will be designated by the same reference numerals, wherever possible, even though they are shown in different drawings.

Also, in the description of the example embodiments, detailed description of well-known related structures or functions will be omitted when it is deemed that such description will cause ambiguous interpretation of the present disclosure.

The terms used herein are not to be interpreted based solely on the terms themselves, but to be interpreted based on the meanings of the terms as defined herein and the overall context of the present disclosure. In addition, the terms may need to be construed as corresponding to technical features or inventive concept described in the first example embodiment based on what an inventor(s) defines each of the terms.

It should be understood that there is no intent to limit the present disclosure to the particular example embodiments disclosed. The examples and illustrated configurations are provided merely as a desirable example of the example embodiments, and not represent all the technical features or inventive concept of the example embodiments. Thus, various changes, modifications, and equivalents of the methods, apparatuses, and/or systems described herein will be apparent after an understanding of the present disclosure.

Figure 2:
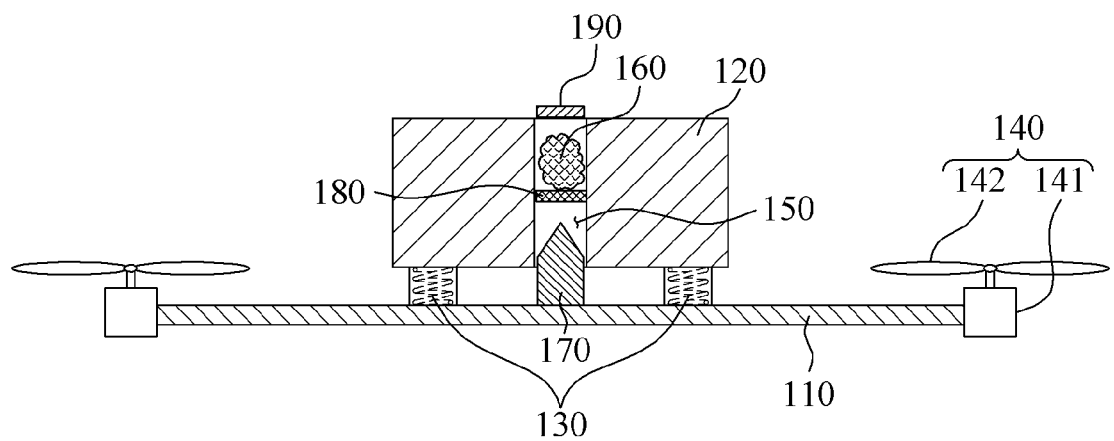
FIG. 2 is a cross-sectional view of a drone including a parachute used to prevent a fall according to an example embodiment.
Figure 3A:
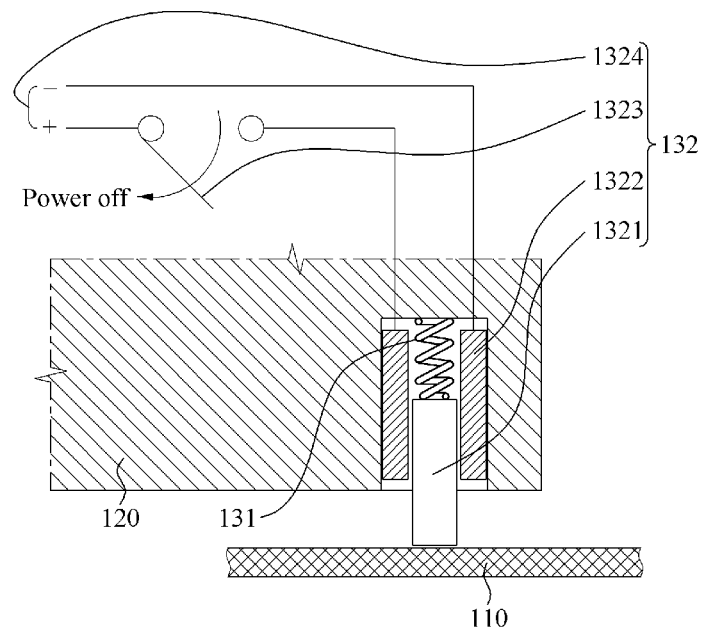
FIGS. 3a and 3b are cross-sectional views of a drone including a restrictor that encloses an elastic member according to an example embodiment.
Figure 3B:
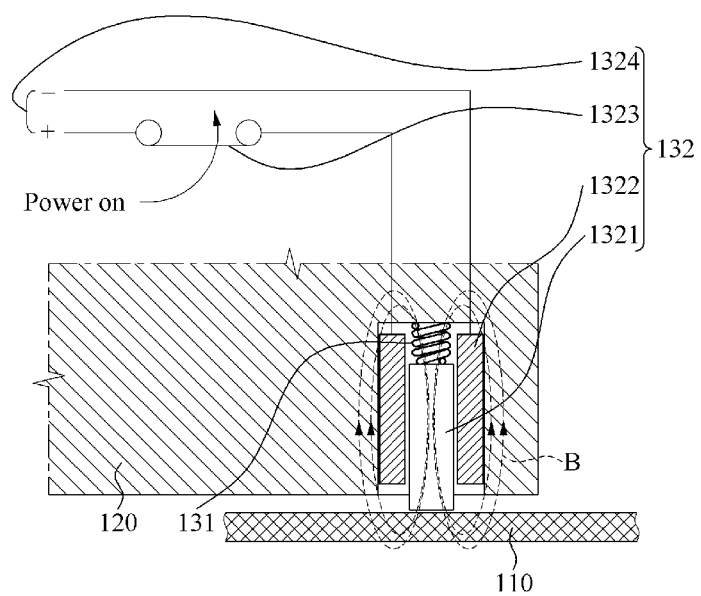
Figure 4:
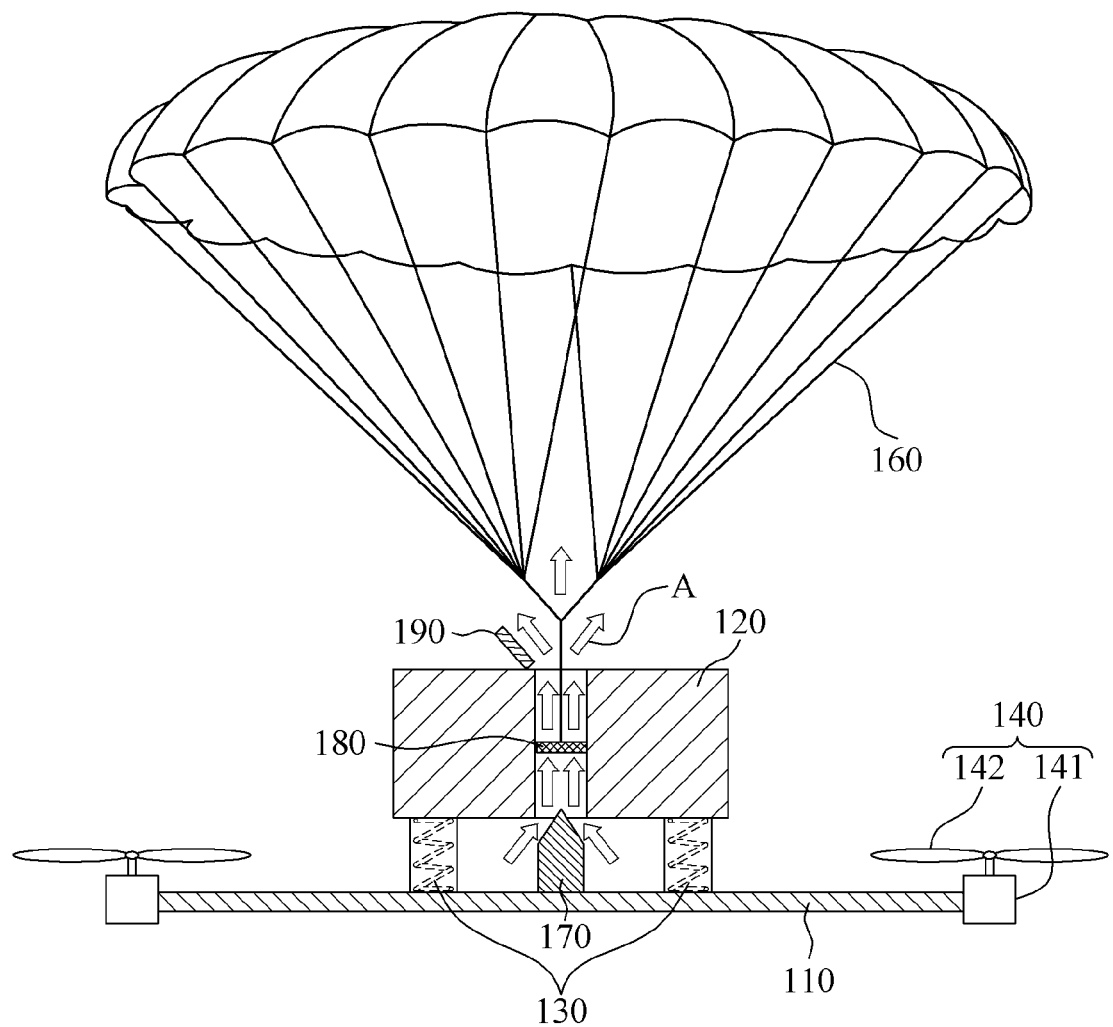
FIG. 4 is a cross-sectional view of a drone including a parachute being unfolded by an air flow through a through-hole according to an example embodiment.
Figure 5:
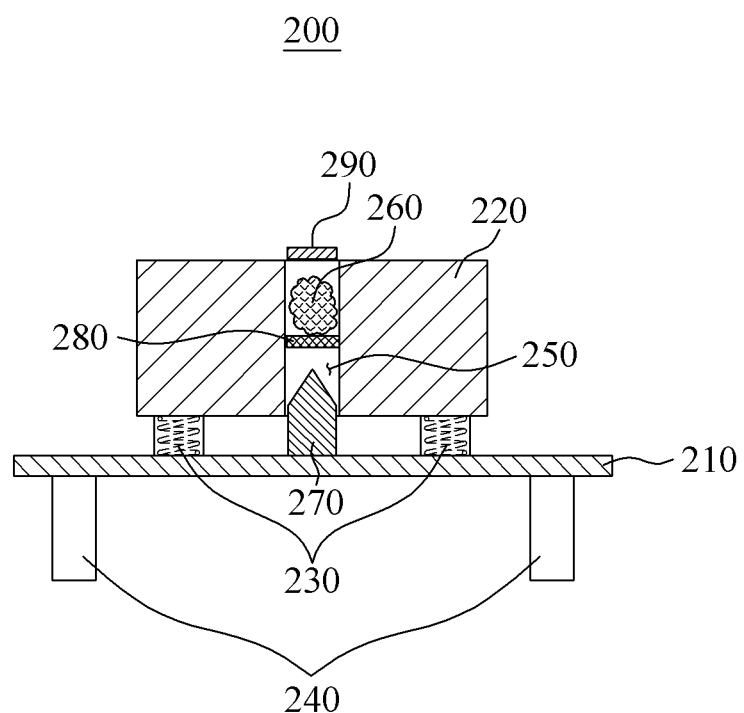
FIG. 5 is a cross-sectional view of a safety device including a connector attachable to or detachable from a flying vehicle and a parachute used to prevent a fall according to an example embodiment.
Figure 6:
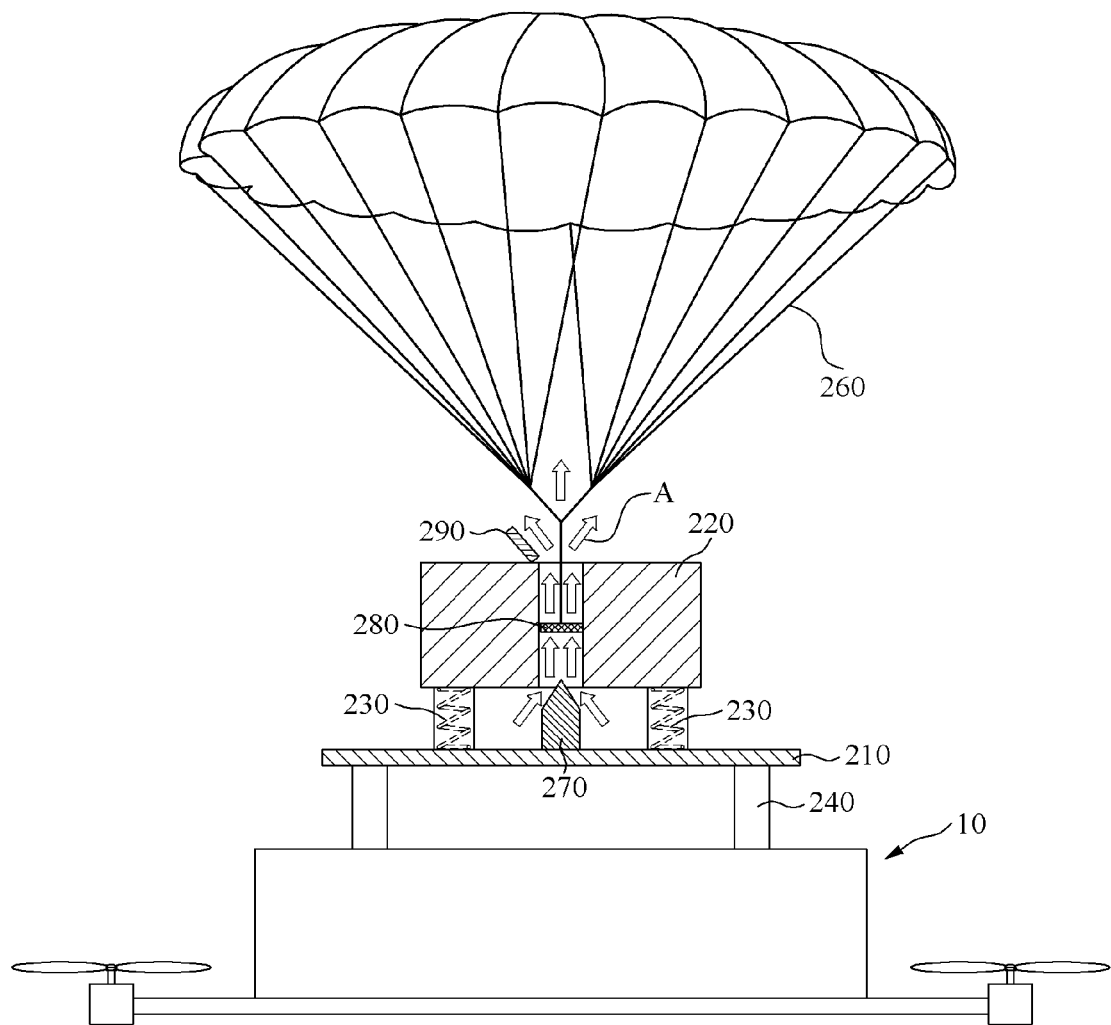
FIG. 6 is a cross-sectional view of a flying vehicle including a safety device operating while being attached to the flying vehicle according to an example embodiment.

FIG. 1 is a perspective view of a drone including a parachute used to prevent a fall according to an example embodiment. FIG. 2 is a cross-sectional view of a drone including a parachute used to prevent a fall according to an example embodiment. FIGS. 3a and 3b are cross-sectional views of a drone including a restrictor configured to enclose an elastic member according to an example embodiment. FIG. 4 is a cross-sectional view of a drone including a parachute being unfolded by an air flow through a through-hole according to an example embodiment. FIG. 5 is a cross-sectional view of a safety device including a connector attachable to or detachable from a flying vehicle and a parachute used to prevent a fall according to an example embodiment. FIG. 6 is a cross-sectional view of a flying vehicle including a safety device operating while being attached to the flying vehicle according to an example embodiment.

Hereinafter, a safety device including a fall preventing parachute and a flying vehicle including a fall preventing parachute will be described according to example embodiments. For convenience of description, a drone 100 is provided herein as an example of the flying vehicle.

Referring to FIGS. 1 and 2, the drone 100 includes a support 110, a main body 120 provided above the support 110 by being separated from the support 110, a connecter 130 configured to connect the main body 120 and the support 110, and a thruster 140 provided on an outer side of the support 110 and configured to generate a thrust force. The main body 120 includes a through-hole 150 therein, and a parachute 160 is provided inside the through-hole 150 such that, in case of a fall, the parachute 160 is discharged out of the through-hole 150 by the connector 130 being deformed.

The support 110 is provided as a frame, and may be formed in an X shape according to an example embodiment. However, a shape thereof is not limited to the illustrated example, and the support 110 may be formed in any shape, such as, for example, a flattened-I shape and a Y shape, as necessary.

According to an example embodiment, the main body 120 may be provided in a cylindrical shape. However, a shape thereof is not limited to the illustrated example, and the main body 120 may be formed in any shape, such as, for example, a hexahedral shape, a triangular pyramid shape, and an octahedral shape, as necessary.

The connector 130 may be an elastic member. According to an example embodiment, a spring may be used as the elastic member. However, the elastic member is not limited to the illustrated example, and thus it is obvious that other elements having elasticity or resilience may also be used.

When gravity works as usual, the connector 130 is contracted by a weight of the main body 120. However, when the drone 100 falls or crashes due to an unskilled operation, a discharged battery, or a breakdown or a failure of the drone 100, the drone 100 enters a zero-gravity state while doing a free fall. Due to the zero-gravity state, the gravity that works normally is not applied to the main body 120, and thus the connector 130 is expanded to be its original state by a resilient force of the connector 130.

The main body 120 includes the through-hole 150 that penetrates through a top and a bottom, or an upper portion and a lower portion, of the main body 120. According to an example embodiment, the through-hole 150 is provided in a cylindrical shape. However, a shape thereof is not limited to the illustrated example, and thus the through-hole 150 may be provided in various shapes, for example, a triangular prism shape and a rectangular column shape. When the drone 100 falls, the through-hole 150 is released from being engaged with a needle valve 170 in a lower end portion of the through-hole 150, and a lid 190 provided in an upper end portion of the through-hole 150 is opened, an air flow from a bottom to a top, or from a lower side to an upper side, of the through-hole 150 is generated.

The drone 100 further includes the needle valve 170 provided on the support 110, and configured to be engaged with the through-hole 150 when the connector 130 is contracted. In a normal state, the connector 130 is contracted by the weight of the main body 120 due to gravity, and thus the through-hole 150 formed in the main body 120 comes into contact with the needle valve 170 to be engaged with. Herein, the through-hole 150 and the needle valve 170 are closely engaged therewith, and thus air may not flow in through the lower end portion of the through-hole 150.

However, when the drone 100 falls, the drone 100 does a free fall and enters a zero-gravity state and the main body 120 is not affected by gravity that acts thereon normally due to the zero-gravity state, and the connector 130 is expanded to be the original state by the resilient force thereof. Thus, compared to when gravity works, the main body 120 moves upwards from the support 110 and the needle valve 170, and the engagement between the through-hole 150 and the needle valve 170 is released.

The needle valve 170, which is manually released from being engaged with the through-hole 150 by such a deformation of the connector 130, is provided as an example. However, the needle valve 170 is not limited to such an example, and the needle valve 170 may also be opened or closed by other mechanical or electrical signals without being dependent on the deformation of the connector 130, and thus be engaged with the through-hole 150 or released from such an engagement.

The drone 100 further includes a sensor (not shown) configured to sense a falling speed of the drone 100 and transfer an open signal to the needle valve 170. The sensor senses the falling speed of the drone 100 such that, when the drone 100 falls fast at an abnormal speed as being in a zero-gravity state, the needle valve 170 is opened and the engagement with the through-hole 150 is released. Thus, the air flow from the bottom to the top of the through-hole 150 is induced.

The drone 100 further includes a sealing member (not shown) in the lower end portion of the through-hole 150 that is engaged with the needle valve 170 to allow the through-hole 150 and the needle valve 170 to be closely engaged therewith when they are engaged as described above. The sealing member is used to prevent air from flowing in or leaking from through the lower end portion of the through-hole 150, and also to prevent instantaneous friction generated at a point in time at which the through-hole 150 and the needle valve 170 come into contact with each other. Herein, a gasket or mohair may be used as the sealing member. However, examples of the sealing member to be used are not limited to the examples described in the foregoing, and other soft materials may also be used.

The parachute 160 is provided, while being folded, inside the through-hole 150. When the drone 100 free-falls, the engagement between the lower end portion of the through-hole 150 and the needle valve 170 is released by the deformation of the connector 130, and the parachute 160 is discharged out of the through-hole 150 to be unfolded by the air flow generated from the bottom to the top of the through-hole 150. A mechanism applied hereto will be described in further detail hereinafter.

The drone 100 further includes a holder 180 provided inside the through-hole 150. The holder 180 is disposed under the parachute 160 to support the parachute 160 such that the parachute 160 does not fall downwards while the parachute 160 is being inside the through-hole 150. The holder 180 is provided in, for example, a circular, a rectangular, or a triangular shape that corresponds to the shape of the through-hole 150. In addition, the holder 180 is connected to the parachute 160 to prevent the parachute 160 from falling out of the drone 100.

The holder 180 may be provided in a mesh form not to prevent the air flow from the bottom to the top of the through-hole 150 from being generated when the drone 100 free-falls. However, a form of the holder 180 is not limited to the mesh form, and thus any forms or shapes having holes through which air flows may also be used.

The drone 100 further includes the lid 190 provided in the upper end portion of the through-hole 150. The lid 190 is connected to the through-hole 150 by a fastening member, such as, a spring, to cover the through-hole 150 in a normal state. Thus, the lid 190 closes an opening in the upper end portion of the through-hole 150 to prevent foreign matters from entering the parachute 160 provided inside the through-hole 150.

However, when the connector 130 is expanded by the resilient force in a zero-gravity state by a free fall of the drone 100, the engagement between the needle valve 170 and the through-hole 150 is thus released, and the air flow from to the bottom to the top of the through-hole 150 is generated, the lid 190 is then opened by an air pressure.

Thus, when the upper end portion of the through-hole 150 is opened, the parachute 160 is discharged out of the through-hole 150 to be unfolded.

The drone 100 also includes the thruster 140. The thruster 140 includes a thrust element 142 configured to generate a thrust force and a drive element 141 configured to generate a driving force and transfer the driving force to the thrust element 142.

The thruster 140 generates the thrust force to enable the drone 100 to operate, for example, fly, and take off and make a landing. Although a propeller type using a thrust force generated by a rotation of a propeller, which is widely used for the drone 100, is recommended for the thrust element 142, a type of the thrust element 142 is not limited to the recommended type and other types, such as, for example, a jet engine, may also be used as the thrust element 142 in addition to the propeller type.

In addition, although an octo-rotor is described as an example for convenience of description, other shapes, for example, a tri-rotor, a quad-rotor, a penta-rotor, a hexa-rotor, an octo-rotor, and the like, may also be applied irrespective of a number and a configuration of the thrust element 142.

The drone 100 further includes a landing member 111 provided under the support 110, and configured to absorb an impact that may be generated when the drone 100 is landed and also support the drone 100 against a surface such that the drone 100 may stand on the surface on which the drone 100 is landed.

Referring to FIGS. 3a and 3b, the drone 100 further includes a restrictor 132 configured to enclose the elastic member, as an example of the connector 130. The restrictor 132 is used to offset the resilient force of the elastic member, and that is, prevent the elastic member from being expanded again by the resilient force.

Referring to FIG. 3a, the restrictor 132 may be a solenoid valve, and an electromagnetic force generated in the solenoid valve may offset a resilient force of a spring 131. As illustrated, the restrictor 132 includes a plunger 1321 disposed between the support 110 and the spring 131, an electromagnet coil 1322 disposed around the plunger 1321 and the spring 131, a power supply 1324 connected to the electromagnet coil 1322 to supply electric power, and a switch 1323 configured to control the supply of electric power.

As described above, when the drone 100 enters a zero-gravity state while free-falling due to a failure or a breakdown of the drone 100, a force that acts on the spring 131 by the weight of the main body 120 disappears. The spring 131 is thus expanded by the resilient force and the engagement between the needle valve 170 and the through-hole 150 is released, and the parachute 160 is thus unfolded.

However, in a case in which the parachute 160 is unfolded even when the drone 100 falls or drops at a high speed, such as in a free fall, by a normal movement, such an unfolding may prevent the drone 100 from operating normally.

Thus, in such a case in which the drone 100 falls or drops at a high speed by a normal movement, the restrictor 132 may play its role to prevent the parachute 160 from being unfolded.

Referring to FIG. 3b, in a case in which the spring 131 is about to be expanded by an influence of a zero-gravity state despite a normal drop of the drone 100, the switch 1323 is switched from an OFF state to an ON state to allow the power supply 1324 to supply electric power. Herein, the resilient force of the spring 131 by such a zero-gravity effect may be offset using the electromagnetic force by a magnetic field B generated between the electromagnet coil 1322 and the plunger 1321.

Thus, the through-hole 150 and the needle valve 170 are maintained to be engaged therewith, and air is prevented from flowing in through the lower end portion of the through-hole 150. Thus, the parachute 160 is not unfolded.

Although the solenoid valve is described as an example of the restrictor 132, a type of the restrictor 132 is not limited to the illustrated example and various types, for example, a hydraulic valve, may also be used.

A detailed mechanism of how a fall preventing parachute is unfolded will be described hereinafter with reference to FIG. 4 based on the description of each component according to an example embodiment.

In a normal operation state in which the drone 100 is landed or flies normally, the contractor 130 is contracted by the weight of the main body 120 due to an effect of gravity, and thus the through-hole 150 formed in the main body 120 comes into contact with the needle valve 170 to be engaged therewith. Herein, the through-hole 150 and the needle valve 170 are closely engaged such that air does not flow in through the lower end portion of the through-hole 150. In addition, the lid 190 covers the upper end portion of the through-hole 150 as described above, the parachute 160 being folded inside the through-hole 150 maintains to be folded, without being unfolded, during a flight.

However, in a case of a free fall during a flight due to occurrence of a failure or abnormality of the drone 100, the drone 100 enters a zero-gravity state. Due to such a zero-gravity condition, gravity that acts on the main body 120 normally does not act on the connector 130, and thus the connector 130 is expanded to be its original state by the resilient force.

Thus, compared to when gravity acts on, the main body 120 moves upwards from the support 110 and the needle valve 170, and thus the engagement between the through-hole 150 and the needle valve 170 is released.

Thus, the air flow from the bottom to the top of the through-hole 150 is generated in a direction as indicated by an arrow (A), and thus the lid 190 is opened by an air pressure. The parachute 160 is thus discharged out of the main body 120 to be unfolded, thereby preventing the drone 100 from falling.

Herein, the parachute 160 being unfolded is connected to the holder 180 to maintain a bond with the main body 120.

As described above, the drone 100 may automatically deploy the parachute 160 only by a force of air, without using power supplied by an additional mechanical or electrical device, and thus reduce costs. In addition, although an error occurs in a controller configured to control the parachute 160, the parachute 160 is automatically unfolded, and thus it is possible to prevent damage to human or property in advance.

However, in a case in which the drone 100 falls or drops at a high speed by a normal operation, the restrictor 132 uses the electromagnetic force to offset the resilient force of the elastic member, and thus the engagement between the through-hole 150 and the needle valve 170 is maintained. Thus, air may be prevented from flowing in through the lower end portion of the through-hole 150, and thus the parachute 160 may also be prevented from being discharged out of the main body 120 and unfolded.

Referring to FIGS. 5 and 6, according to another example embodiment, a safety device 200 that is attachable to or detachable from a flying vehicle 10 includes a support 210, a main body 220 disposed above the support 210 by being separated from the support 210, a through-hole 250 formed in the main body 220, a parachute 260 provided inside the through-hole 250, a needle valve 270 provided in a lower end portion of the through-hole 250 and configured to be engaged with the through-hole 250, and a connector 240 provided under the support 210 and configured to attach and detach the safety device 200 to and from the flying vehicle 10.

The safety device 200 is attachable to various types of commercially available flying vehicle or drone through the connector 240. That is, by the connector 240, the safety device 200 may be attached to a main body, a support, or other portions of a flying vehicle or a drone, and also detached from the flying vehicle or the drone when it is landed. Herein, it is obvious that the connector 240 is provided in various forms or types, for example, a hydraulic type and a fastening type using a bolt and a nut.

In a case in which the safety device 200 is connected to the flying vehicle 10 and the safety device 200 falls along with the flying vehicle 10 due to a failure or a breakdown of the flying vehicle 10, the needle valve 270 is opened. In such a case, an air flow from bottom to top as indicated by A is generated through the through-hole 250, and thus the parachute 260 is discharged out of the through-hole 250.

In addition, the safety device 200 further includes a sensor (not shown) configured to sense a falling speed of the safety device 200 and transfer an open signal to the needle valve 270.

The safety device 200 further includes an elastic member 230 configured to connect the main body 220 and the support 210. The elastic member 230 is configured to be expanded by a resilient force when the main body 220 is being in a zero-gravity state due to a fall of the safety device 200. When the elastic member 230 is expanded, the needle valve 270 is opened.

The safety device 200 further includes a restrictor (not shown) configured to enclose the elastic member 230 such that the parachute 260 is not unfolded in a case in which a flying vehicle or a drone falls or drops at a high speed by a normal movement. The restrictor may be a solenoid valve. An electromagnetic force generated in the solenoid valve may offset the resilient force of the elastic member 230.

In addition, the safety device 200 further includes a holder 280 provided inside the through-hole 250, and the holder 280 is disposed under the parachute 260 and configured to support the parachute 260 such that the parachute 260 does not fall downwards. The holder 280 is provided in a mesh form, and thus an air flow from a bottom to a top of the through-hole 250 is generated when the safety device 200 falls.

In addition, the safety device 200 further includes a lid 290 provided in an upper end portion of the through-hole 250, and the lid 290 is configured to be opened by an air flow through the through-hole 250.

While the present disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

The invention claimed is:

1. A drone comprising:
a support;
a main body provided above the support by being separated from the support;
a connector configured to connect the main body and the support; and
a thruster provided on an outer side of the support and configured to generate a thrust force,
wherein the main body comprises a through-hole therein,
wherein the through-hole contains a parachute,
wherein, when the drone falls, the parachute is discharged out of the through-hole by the connector being deformed.

2. The drone of claim 1, wherein the connector is an elastic member,
wherein the elastic member is configured to be expanded by a resilient force in response to the main body being in a zero-gravity state.

3. The drone of claim 2, further comprising:
a needle valve provided on the support, and configured to be engaged with the through-hole when the elastic member is contracted.

4. The drone of claim 2, further comprising:
a restrictor configured to enclose the elastic member,
wherein the restrictor is configured to offset the resilient force of the elastic member.

5. The drone of claim 4, wherein the restrictor is a solenoid valve,
wherein an electromagnetic force generated in the solenoid valve is configured to offset the resilient force of the elastic member.

6. The drone of claim 3, further comprising:
a sealing member provided in a lower end portion of the through-hole to be engaged with the needle valve.

7. The drone of claim 1, further comprising:
a holder provided inside the through-hole,
wherein the holder is disposed under the parachute to support the parachute such that the parachute does not fall downwards.

8. The drone of claim 7, wherein the holder is provided in a mesh form such that, when the drone falls, an air flow from a bottom to a top of the through-hole is generated.

9. The drone of claim 1, further comprising:
a lid provided in an upper end portion of the through-hole,
wherein the lid is opened by an air flow through the through-hole.

10. The drone of claim 1, further comprising:
a landing member provided under the support.

11. A flying vehicle comprising:
a support;
a main body provided above the support by being separated from the support;
a thruster provided on an outer side of the support and configured to generate a thrust force;
a through-hole formed in the main body;
a parachute provided inside the through-hole; and
a needle valve provided in a lower end portion of the through-hole and configured to be engaged with the through-hole,
wherein, when the flying vehicle falls, the needle valve is opened and an air flow from bottom to top is generated through the through-hole, and the parachute is configured to be discharged out of the through-hole.

12. The flying vehicle of claim 11, further comprising:
a sensor configured to sense a falling speed of the flying vehicle, and transfer an open signal to the needle valve.

13. The flying vehicle of claim 11, further comprising:
an elastic member configured to connect the main body and the support,
wherein, when the main body is in a zero-gravity state, the elastic member is configured to be expanded by a resilient force,
wherein, when the elastic member is expanded, the needle valve is opened.

14. The flying vehicle of claim 11, further comprising:
a holder provided inside the through-hole,
wherein the holder is disposed under the parachute, and configured to support the parachute such that the parachute does not fall downwards, and
the holder is provided in a mesh form such that an air flow from a bottom to a top of the through-hole is generated when the flying vehicle falls.

15. The flying vehicle of claim 11, further comprising:
a lid provided in an upper end portion of the through-hole,
wherein the lid is configured to be opened by an air flow through the through-hole.

16. A safety device to be attached to or detached from a flying vehicle, the safety device comprising:
a support;
a main body provided above the support by being separated from the support;
a through-hole formed in the main body;
a parachute provided inside the through-hole;
a needle valve provided in a lower end portion of the through-hole and configured to be engaged with the through-hole; and
a connector provided under the support and configured to attach or detach the safety device to and from the flying vehicle,
wherein, when the safety device falls, the needle valve is configured to be opened, an air flow from bottom to top is generated through the through-hole, and the parachute is configured to be discharged out of the through-hole.

17. The safety device of claim 16, further comprising:
a sensor configured to sense a falling speed of the safety device, and transfer an open signal to the needle valve.

18. The safety device of claim 16, further comprising:
an elastic member configured to connect the main body and the support,
wherein, when the main body is in a zero-gravity state due to the safety device falling, the elastic member is configured to be expanded by a resilient force, and
the needle valve is configured to be opened when the elastic member is expanded.

19. The safety device of claim 18, further comprising:
a restrictor configured to enclose the elastic member,
wherein the restrictor is a solenoid valve, and
an electromagnetic force generated in the solenoid valve is configured to offset the resilient force of the elastic member.

20. The safety device of claim 16, further comprising:
a holder provided inside the through-hole; and
a lid provided in an upper end portion of the through-hole,
wherein the holder is disposed under the parachute, and configured to support the parachute such that the parachute does not fall downwards, and the holder is provided in a mesh form such that an air flow from a bottom to a top of the through-hole is generated when the safety device falls,
wherein the lid is configured to be opened by an air flow through the through-hole.

* * * * *